US012591740B2

(12) United States Patent
Saranathan et al.

(10) Patent No.: US 12,591,740 B2
(45) Date of Patent: Mar. 31, 2026

(54) METHODS AND SYSTEMS FOR GENERATING TEXTUAL FEATURES

(71) Applicant: Panasonic Intellectual Property Management Co., Ltd., Osaka (JP)

(72) Inventors: Gayathri Saranathan, Singapore (SG); Nway Nway Aung, Singapore (SG); Ariel Beck, Singapore (SG); Chandra Suwandi Wijaya, Singapore (SG); Jianyu Chen, Singapore (SG); Debdeep Paul, Singapore (SG); Sahim Yamaura, Singapore (SG); Koji Miura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 276 days.

(21) Appl. No.: 18/367,310

(22) Filed: Sep. 12, 2023

(65) Prior Publication Data

US 2025/0086389 A1 Mar. 13, 2025

(51) Int. Cl.
*G06F 40/279* (2020.01)
*G06N 20/00* (2019.01)

(52) U.S. Cl.
CPC .......... *G06F 40/279* (2020.01); *G06N 20/00* (2019.01)

(58) Field of Classification Search
None
See application file for complete search history.

(56) References Cited

U.S. PATENT DOCUMENTS

| | | |
|---|---|---|
| 10,861,064 B2 | 12/2020 | Cleverley |
| 11,379,668 B2 | 7/2022 | Tutubalina et al. |
| 2023/0134651 A1* | 5/2023 | Agbamu .............. G06V 40/172 705/325 |

* cited by examiner

*Primary Examiner* — Quynh H Nguyen
(74) *Attorney, Agent, or Firm* — Rimon P.C.

(57) ABSTRACT

According to an embodiment, a method for generating textual features corresponding to text documents from a raw dataset is disclosed. The method includes preprocessing the text documents and determining topic probability scores (TPS) and confidence scores (CS) using unsupervised and supervised machine learning models, respectively. The combination of TPS and CS is used to generate a compound distribution score (CDS), which forms a comprehensive representation of the output of the machine learning models. The determined TPS, CS, and CDS are then used to generate a set of textual features, which serve as independent variables for a forecasting model.

16 Claims, 7 Drawing Sheets

OUTPUT RESULT 106

SYSTEM 100

104

Unsupervised Machine Learning (ML) Model 104a

Supervised Machine Learning (ML) Model 104b

Forecast Model 104c

USER DEVICE(S) 102

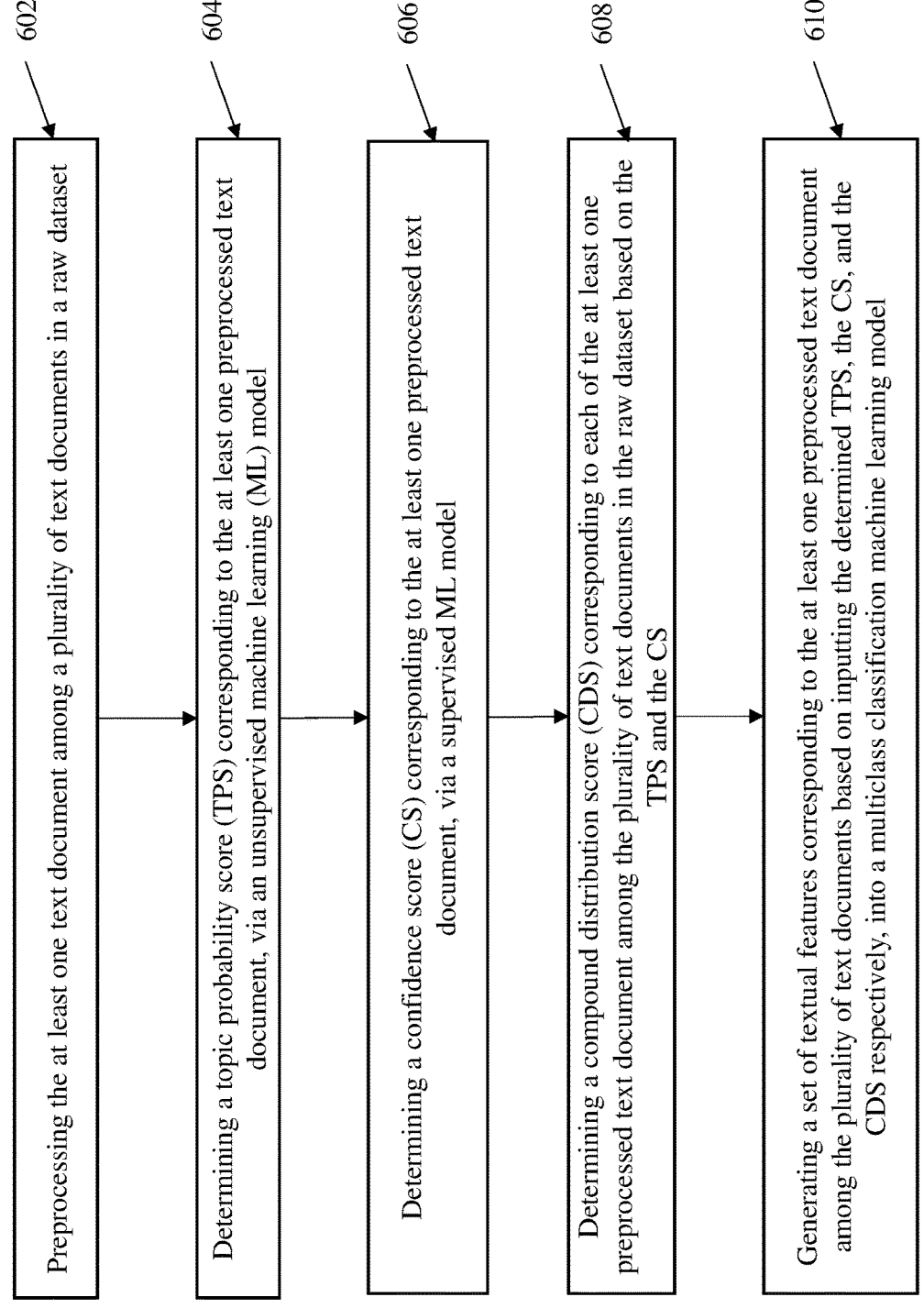

602

Preprocessing the at least one text document among a plurality of text documents in a raw dataset

604

Determining a topic probability score (TPS) corresponding to the at least one preprocessed text document, via an unsupervised machine learning (ML) model

606

Determining a confidence score (CS) corresponding to the at least one preprocessed text document, via a supervised ML model

608

Determining a compound distribution score (CDS) corresponding to each of the at least one preprocessed text document among the plurality of text documents in the raw dataset based on the TPS and the CS

610

Generating a set of textual features corresponding to the at least one preprocessed text document among the plurality of text documents based on inputting the determined TPS, the CS, and the CDS respectively, into a multiclass classification machine learning model

METHODS AND SYSTEMS FOR GENERATING TEXTUAL FEATURES

FIELD OF THE INVENTION

The present invention generally relates to Machine Learning (ML) models, and more particularly relates to systems and methods for generating textual features utilizing multiple ML models to generate a forecast result.

BACKGROUND

Artificial Intelligence (AI) models have revolutionized countless industries, from healthcare to finance, by enabling powerful predictive models. However, AI models often face challenges when it comes to capturing contextual information from external sources. One of the primary limitations of the AI models is their difficulty in incorporating contextual information from external sources. Traditional machine learning approaches typically rely on events in the training set to make predictions, without considering real-time or near-future events. This can lead to inaccuracies and a lack of adaptability in the face of evolving situations.

As AI models have made significant strides in recent years, reshaping the way humans interact with technology and revolutionizing various industries. The AI models, trained with advanced algorithms and massive datasets, have demonstrated remarkable capabilities in tasks like image recognition, natural language processing, and decision-making. However, despite impressive accomplishments, AI models may still face certain limitations that hinder their ability to achieve the highest levels of accuracy and adaptability.

One of the key challenges faced by the AI models is the difficulty in incorporating contextual information from external sources. A traditional AI model is trained on historical data, often referred to as the "training set," which contains examples and patterns from the past. The AI models learn to recognize and generalize from this historical data, making predictions based on the patterns they have identified during training.

While this approach works well for tasks where historical patterns are stable and consistent, it falls short in scenarios involving dynamic and ever-changing contexts. Real-world situations often involve real-time or near-future events that are not captured in the training data. As a result, the AI models may struggle to adapt and respond effectively to rapidly evolving circumstances.

For example, consider an AI model which is designed to predict stock market movements. Traditional machine learning approaches would rely solely on historical stock market data, analysing past trends and patterns to make predictions. However, the stock market is influenced by a multitude of real-time factors, such as news events, economic indicators, geopolitical developments, and investor sentiment, which may not be accounted for in the training data. Consequently, the model's predictions may not accurately reflect the current market dynamics, leading to potential inaccuracies and missed opportunities.

Another critical key aspect where the lack of contextual information hampers the AI models is in natural language processing tasks. For instance, sentiment analysis models, which aim to determine the emotional tone of a text, can be limited in their accuracy when they don't consider the broader context of the conversation, the speaker's identity, or the cultural nuances involved.

Incorporating contextual information is essential for AI models to perform effectively in real-world scenarios. The AI models that may adapt to current and near-future events may generate more accurate predictions, provide better recommendations, and offer more contextually relevant responses.

Hence, there is a need to address the limitations of incorporating textual information in the existing AI models. An innovative solution is required to incorporate external contextual information and make the AI models more adaptable, dynamic, and suitable for evolving environments. Such advancements will lead to more reliable and efficient AI applications across industries, enhancing decision-making processes and enriching human interactions with intelligent systems.

Therefore, there is a need for a solution to address the aforementioned issues and challenges.

SUMMARY

This summary is provided to introduce a selection of concepts, in a simplified format, that are further described in the detailed description of the invention. This summary is neither intended to identify essential inventive concepts of the invention nor is it intended for determining the scope of the invention.

According to an embodiment of the present disclosure, a method for generating textual features corresponding to at least one text document. The method includes preprocessing the at least one text document among a plurality of text documents in a raw dataset. The method includes determining a topic probability score (TPS) corresponding to the at least one preprocessed text document, via an unsupervised machine learning (ML) model, wherein the TPS indicates probability of each of the at least one preprocessed text document among the plurality of text documents, being associated with at least one cluster generated by the unsupervised ML model. The method includes determining a confidence score (CS) corresponding to the at least one preprocessed text document, via a supervised ML model, wherein the CS indicates a reliability level associated with classification of each of the at least one preprocessed text document among the plurality of text documents, predicted by the supervised ML model. Further, the method includes determining a compound distribution score (CDS) corresponding to each of the at least one preprocessed text document among the plurality of text documents in the raw dataset based on the TPS and the CS, wherein the CDS indicates a weighted average of the TPS and the CS to generate a comprehensive representation for output of the unsupervised ML model and the supervised ML model respectively. Furthermore, the method includes generating a set of textual features corresponding to the at least one preprocessed text document among the plurality of text documents based on inputting the determined TPS, the CS, and the CDS respectively, into a multiclass classification machine learning model, wherein the set of textual features indicates independent variables for a forecasting model.

According to an embodiment of the present disclosure, a system for generating textual features corresponding to at least one text document. The system includes a memory, at least one processor communicably coupled to the memory. The at least one processor is configured to preprocess the at least one text document among a plurality of text documents in a raw dataset. The at least one processor is configured to determine a topic probability score (TPS) corresponding to the at least one preprocessed text document, via an unsupervised machine learning (ML) model, wherein the TPS indicates probability of each of the at least one preprocessed text document among the plurality of text documents, being associated with at least one cluster generated by the unsupervised ML model. The at least one processor is configured to determine a confidence score (CS) corresponding to the at least one preprocessed text document, via a supervised ML model, wherein the CS indicates a reliability level associated with classification of each of the at least one preprocessed text document among the plurality of text documents, predicted by the supervised ML model. The at least one processor is configured to determine a compound distribution score (CDS) corresponding to each of the at least one preprocessed text document among the plurality of text documents in the dataset based on the determined TPS and the determined CS, wherein the CDS indicates a weighted average of the TPS and the CS to generate a comprehensive representation for output of the unsupervised ML model and the supervised ML model respectively. The at least one processor is configured to generate a set of textual features corresponding to the at least one preprocessed text document among the plurality of text documents based on inputting the determined TPS, the CS, and the CDS into a multiclass classification machine learning model, wherein the set of textual features indicates independent variables for a forecasting model.

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 illustrates a flow chart depicting a method for generating textual features corresponding to at least one text document, according to an embodiment of the present disclosure.

Figure 1:
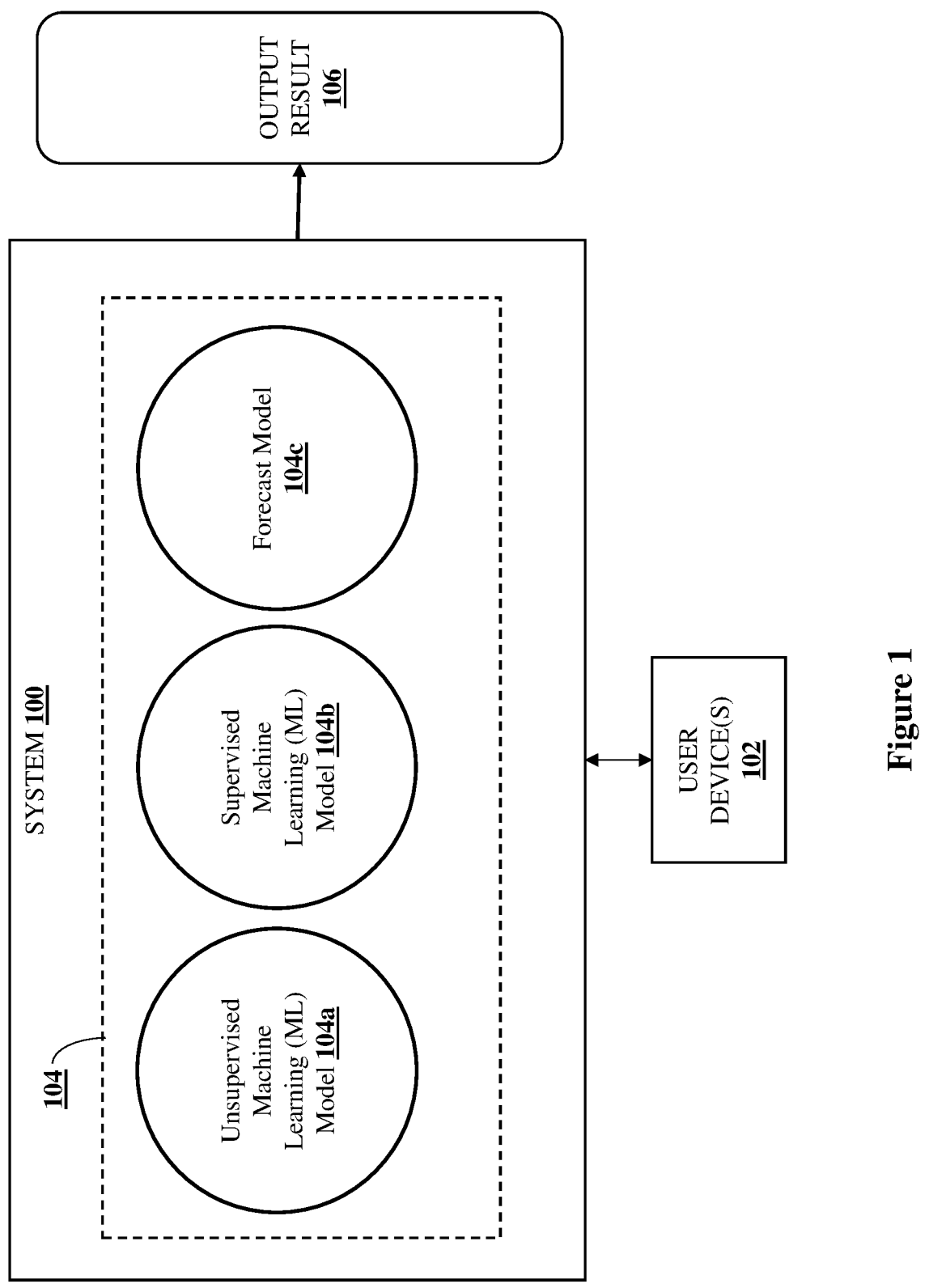
FIG. 1 is an environment of a system for generating textual features corresponding to at least one text document, including a plurality of Machine Learning (ML) models, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present disclosure proposes an enhanced AI model by incorporating information from unstructured texts along with traditional features. This departure from traditional machine learning methods, which rely solely on historical training data, allows the AI models to consider real-time and future events, greatly improving their adaptability and performance. Consequently, the AI models enriched with textual and traditional features may find various applications in demand market forecasting, stock market analysis, election predictions, and recommender systems.

Furthermore, the present disclosure integrates topic modelling and topic mood, thus improving the accuracy of natural language processing models like sentiment analysis but also enhances textual features for broader ML applications. This innovative approach empowers the AI models to possess a more robust feature set and obtain textual-explainability, thereby significantly advancing their capabilities in understanding and processing human language.

According to one embodiment of the present disclosure, a proposed system and a method are disclosed for generating textual features corresponding to at least one text document using a multiclass classification machine learning model. The proposed solution includes determining a topic probability score (TPS), via an unsupervised machine learning (ML) model and determining a confidence score (CS), via a supervised ML model. Further, the output of both the unsupervised ML model and the supervised ML model may be fed into the multiclass classification model to generate a set of textual features.

FIG. 1 is an environment of a system 100 for generating textual features corresponding to at least one text document, including a plurality of Machine Learning (ML) models, according to an embodiment of the present disclosure.

The system 100 may correspond to a stand-alone system or a system based in a server/cloud architecture communicably coupled to one or more user devices 102. Alternatively, the system 100 may be residing in the user devices 102. The system 100 may be configured to implement a plurality of ML models 104a-104c. In the illustrated embodiment, the plurality of ML models 104a-104c are depicted, to effectively perform the required functionality of the system 100, such as generating the set of textual features for outputting demand forecasting. The system 100 may correspond to, but is not limited to, a personal computing device, a user equipment, a laptop, a tablet, a mobile communication device, and so forth.

The system 100 may be disposed in communication with one or more user devices 102. Examples of the user device 102 may include, but are not limited to, a mobile device, a laptop, a tablet, a personal computing device, a handheld device, and so forth.

In an embodiment, the system 100 may be configured to receive input data from the one or more user devices 102. The input data may correspond to a raw dataset which may be original, unprocessed, and unstructured data collected or obtained from various sources. In a non-limiting example, the raw dataset may include a plurality of text documents, such as news, blogs, articles, and social media comments, corresponding to a product/service. The system 100 may process the received input data via the plurality of ML models 104a-104c to generate the set of textual features and a final forecast with explainability.

In an embodiment, the plurality of ML models 104a-104c may include an unsupervised ML model 104a, a supervised ML model 104b, and a forecasting ML model 104c. In an example, the unsupervised ML model 104a may indicate a topic model. In the example, the topic model may determine at least one topic present in the raw dataset. Some examples of the topic model may be a Bidirectional Encoder Representations from Transformers (BERT) topic model, a Correlation Explanation (CorEx) model, a Latent Dirichlet Allocation (LDA) model, a Non-Negative Matrix Factorization (NMF) model, a guided LDA model, and a Gensim mode with natural language processing to understand a context and provide a label corresponding to at least one document among the plurality of text documents in the raw dataset. In an example, the supervised ML model 104b may include a sentiment analysis model, a Named Entity Recognition model, an N-Gram model, and a Part-of-speech (POS) labelling Model. In the example, the supervised ML model 104b may determine the sentiment or emotional tone expressed in the at least one document among the plurality of text documents in the raw dataset, such as a review, social media post, or customer feedback. In an example, the forecasting ML model 104c may determine future values or trends based on historical data and patterns. In a non-limiting example, the forecasting ML model 104c may be time series-based models, such as recurrent neural network (RNN), bidirectional long short-term memory (Bi-LSTM), autoregressive integrated moving average (ARIMA). In another non-limiting example the forecasting ML model 104c may be fusion of time series-based feature extraction methods and machine learning classification models such as random forest model (RF) and XGBoost model.

The system 100 may process the received input data via the unsupervised ML model 104a, and the supervised ML model 104b to generate an output result 106 which is an indication of the set of textual features. The set of textual features may represent specific characteristics or representations extracted from unstructured text data or the raw data. The set of textual features may be an input to the forecasting ML model 104c for outputting the final forecast.

Figure 2:
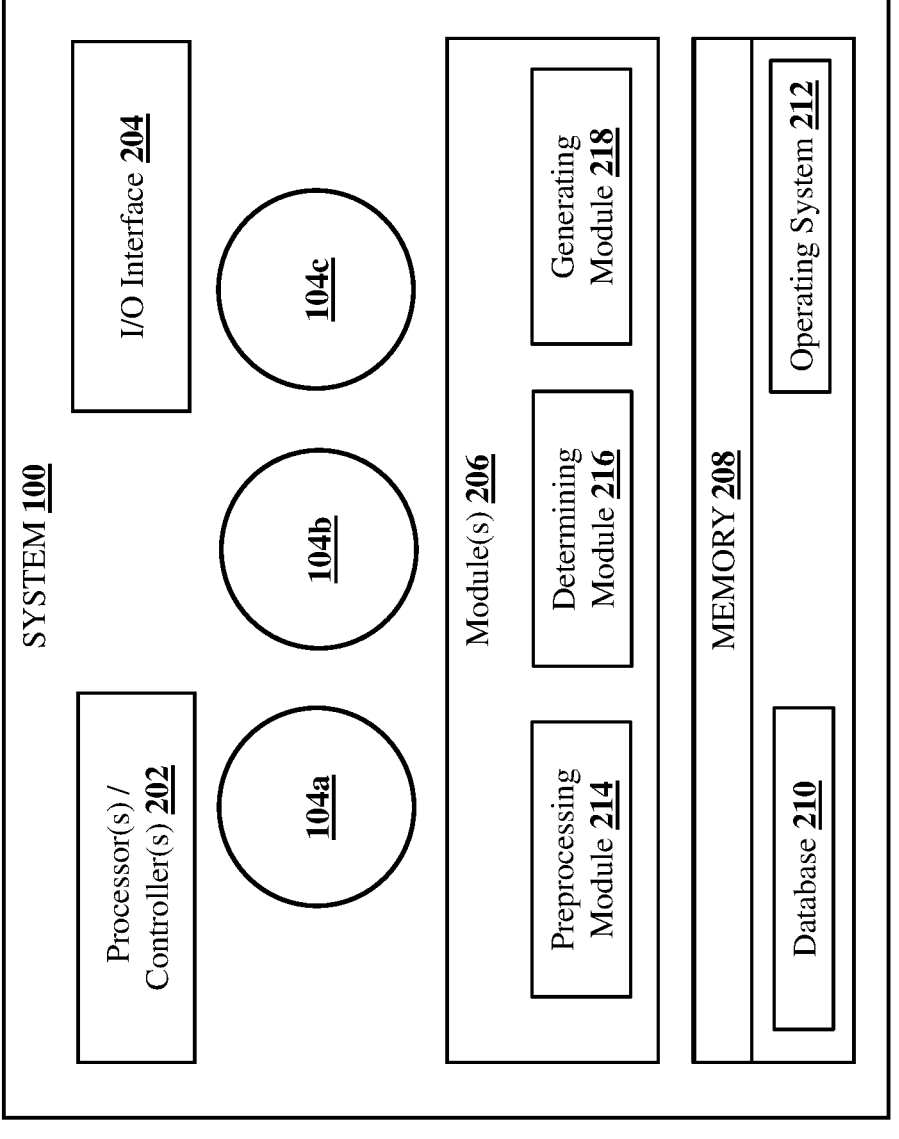
FIG. 2 illustrates an exemplary block diagram of the system of FIG. 1, according to an embodiment of the present disclosure.

FIG. 2 illustrates an exemplary block diagram of the system 100 of FIG. 1, according to an embodiment of the present disclosure. In an embodiment, the system 100 may be included within the user device 102 (as shown in FIG. 1) and configured to generate the set of textual features based on received input data. In another embodiment, the system 100 may be configured to operate as a standalone device or a system based in the server/cloud architecture communicably coupled to the user device 102. The system 100 may include a processor/controller 202, an Input/Output (I/O) interface 204, one or more modules 206, and a memory 208.

In an exemplary embodiment, the processor/controller 202 may be operatively coupled to each of the I/O interface 204, the modules 206, and the memory 208. In one embodiment, the processor/controller 202 may include at least one data processor for executing processes in Virtual Storage Area Network. In another embodiment, the processor/controller 202 may include specialized processing units such as, integrated system (bus) controllers, memory management control units, floating point units, graphics processing units, digital signal processing units, etc. In one embodiment, the processor/controller 202 may include a Central Processing Unit (CPU), a Graphics Processing Unit (GPU), or both. In another embodiment, the processor/controller 202 may be one or more general processors, digital signal processors, application-specific integrated circuits, field-programmable gate arrays, servers, networks, digital circuits, analog circuits, combinations thereof, or other now known or later developed devices for analyzing and processing data. The processor/controller 202 may execute a software program, such as code generated manually (i.e., programmed) to perform the desired operation.

The processor/controller 202 may be disposed in communication with one or more input/output (I/O) devices via the I/O interface 204. The I/O interface 204 may employ communication code-division multiple access (CDMA), high-speed packet access (HSPA+), global system for mobile communications (GSM), long-term evolution (LTE), WiMax, or the like, etc.

In an embodiment, when the system 100 is located remotely, the system may use the I/O interface 204 to communicate with one or more I/O devices, specifically, the user device 102 to receive the input data and transmit the set of textual features or the final forecast as output along with other relevant information.

In an embodiment, the processor/controller 202 may be disposed in communication with a communication network via a network interface. In an embodiment, the network interface may be the I/O interface 204. The network interface may connect to the communication network to enable connection of the system 100 with the outside environment and/or device/system. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the system 100 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

In an exemplary embodiment, the processor/controller 202 receives the raw dataset comprising the plurality of text documents. In an embodiment, the raw dataset may correspond to the plurality of text documents for which the set of textual features needs to be generated via the system 100. In a non-limiting example of the set of textual features may include time series data. Further, the set of textual features may be an input to generate the final forecast.

In some embodiments, the processor/controller 202 may be configured to preprocess the at least one text document among a plurality of text documents in the raw dataset. In a non-limiting example, the raw dataset may correspond to the unprocessed, original data collected from various sources such as social media post, reviews, blogs, and surveys. The preprocessing of the at least one text document may correspond to segregation of the raw data based on at least a type of data, an amount of data, and alike. In an example, preprocessing may include converting all text to lowercase, removing punctuation, special characters, and numbers, handling contractions, removing stopwords (commonly used words like "the," "and," "is," etc.), and performing stemming or lemmatization to reduce words to their root forms. Thus, preprocessing the at least one text document may reduce noise and make the text in the at least one text document more consistent and manageable for the plurality of machine learning models 104a-104c. Further, the processor/controller 202 may be configured to convert the textual data into a numerical representation to determine a vector based on the at least one preprocessed text document. In a non-limiting example, a counter vectorization technique and a term Frequency-Inverse Document Frequency (TF-IDF) technique may be used to determine the vector from the at least one preprocessed text document.

In some embodiments, the processor/controller 202 may also be configured to generate one or more Graphical User Interfaces (GUIs) to display the set of textual features or the final forecast with explainability. The GUIs may enable a user of the user device 102 to access and interact with information generated by the system 100. The GUIs may be used by the user to provide one or more user inputs such as, but not limited to, user selection of one or more features and/or the plurality of ML models 104a-104c.

In an exemplary embodiment, the generated set of textual features may correspond to the model explainability of the final forecast. Further, the plurality of ML models 104 may be implemented in the memory 208 and/or via any other modules/units of the system 100. In some embodiments, the processor/controller 202 may implement the plurality of ML models 104 using information stored in the memory 208.

In some embodiments, the memory 208 may be communicatively coupled to the at least one processor/controller

202. The memory 208 may be configured to store data, and instructions executable by the at least one processor/controller 202. In one embodiment, the memory 208 may include the plurality of ML models 104a-104c, as discussed throughout the disclosure. In another embodiment, the plurality of ML models 104a-104c may be stored on a cloud network or a server which is to be tested for robustness and accuracy.

In some embodiments, the modules 206 may be included within the memory 208 or alternatively may be independent and out of the memory 208 or combination thereof. The one or more modules 206 may include a set of instructions that may be executed by the processor/controller 202 to cause the system 100 to perform any one or more of the methods disclosed herein. The memory 208 may further include a database 210 to store data. In one embodiment, the database 210 may be configured to store the information as required by the one or more modules 206 and processor/controller 202 to perform one or more functions to generate the set of textual features corresponding to the unsupervised ML model 104a and the supervised ML model 104b.

The one or more modules 206 in conjunction with the processor/controller 202 may be configured to perform method steps of the present disclosure using the data stored in the database 210, to generate the set of textual features corresponding to the unsupervised ML model 104a and the supervised ML model 104b, as discussed throughout this disclosure. In an embodiment, each of the one or more modules 206 may be a hardware unit which may be outside the memory 208.

In one embodiment, the memory 208 may communicate via a bus within the system 100. The memory 208 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 208 may include a cache or random-access memory for the processor/controller 202. In alternative examples, the memory 208 is separate from the processor/controller 202, such as a cache memory of a processor, the system memory, or other memory. The memory 208 may be an external storage device or database for storing data. The memory 208 may be operable to store instructions executable by the processor/controller 202. The functions, acts, or tasks illustrated in the figures or described may be performed by the programmed processor/controller 202 for executing the instructions stored in the memory 208. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like. In some embodiment, the memory 208 may include an operating system 212 to support one or more operations of the system 100 and/or the processor/controller 202.

Further, the present invention contemplates a computer-readable medium that includes instructions or receives and executes instructions responsive to a propagated signal, so that a device connected to a network may communicate voice, video, audio, images, or any other data over a network. Further, the instructions may be transmitted or received over the network via a communication port or interface or using a bus (not shown). The communication port or interface may be a part of the processor/controller 202 or may be a separate component. The communication port may be created in software or may be a physical connection in hardware. The communication port may be configured to connect with a network, external media, the display, or any other components in the system 100, or combinations thereof. The connection with the network may be a physical connection, such as a wired Ethernet connection, or may be established wirelessly. Likewise, the additional connections with other components of the system 100 may be physical or may be established wirelessly. The network may alternatively be directly connected to the bus.

For the sake of brevity, the architecture and standard operations of the memory 208, the database 210, the processor/controller 202, and the I/O interface 204 are not discussed in detail.

As illustrated, in one embodiment, the one or more modules 206 may include a preprocessing module 214, a determining module 216, and a generating module 218. The preprocessing module 214, the determining module 216, and the generating module 218 may be in communication with each other and with the plurality of ML models 104. Further, a detailed explanation of the generation of the set of textual features by the one or more modules 106 has been provided in the following description.

Figure 3:
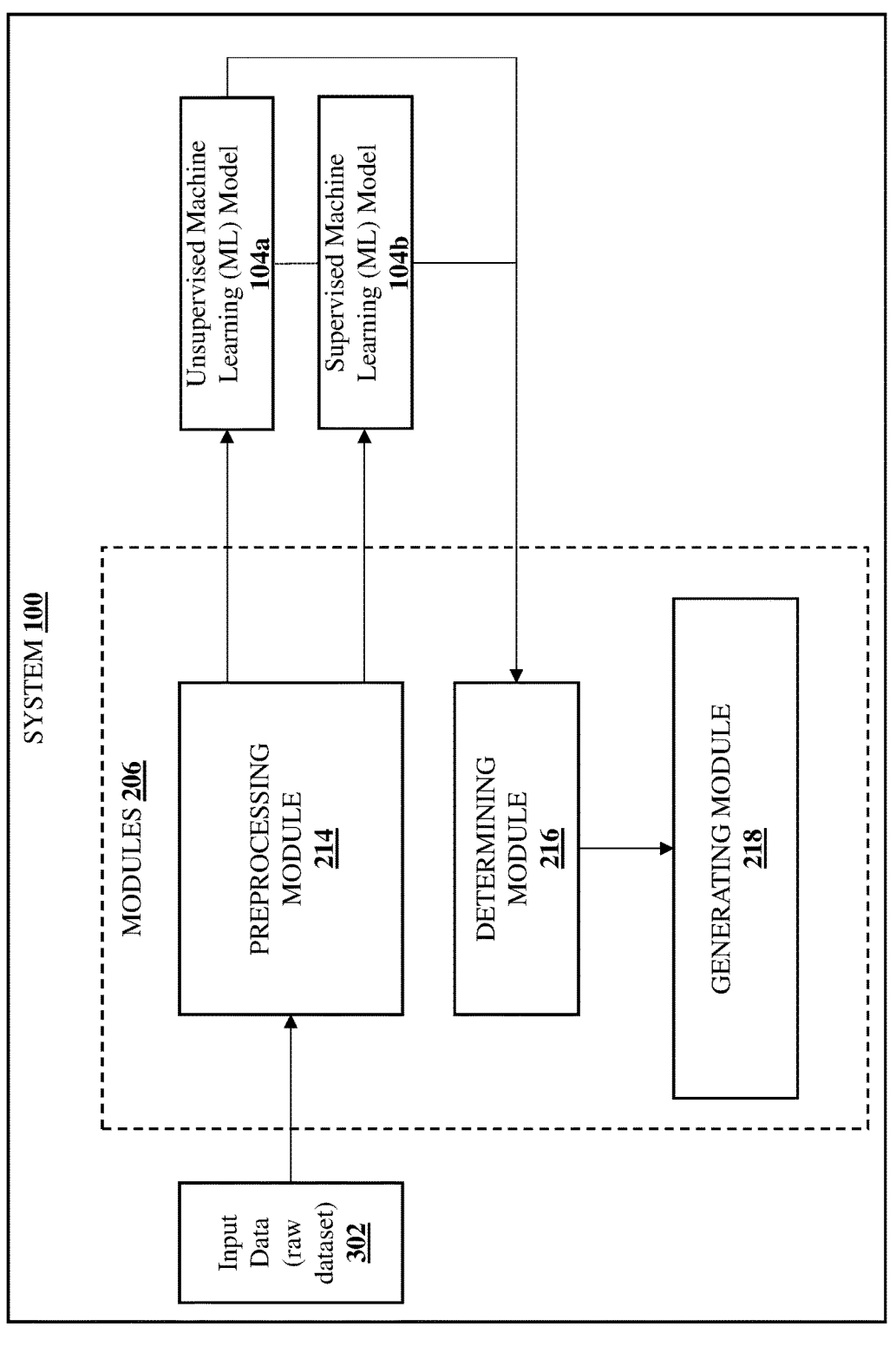
FIG. 3 illustrates an exemplary block diagram of various modules of the system of FIG. 1, according to an embodiment of the present disclosure.

FIG. 3 illustrates an exemplary block diagram of various modules of the system 100, according to an embodiment of the present disclosure. Specifically, FIG. 3 illustrates input data 302, the preprocessing module 214, the determining module 216, the generating module 218, the unsupervised ML model 104a and the supervised ML model 104b. The preprocessing module 214, the determining module 216, the generating module 218, the unsupervised ML model 104a and the supervised ML model 104b may be part of the modules 206, as shown in FIG. 2.

The input data 302 may correspond to the raw dataset including the plurality of text documents, as explained above. In an embodiment, the preprocessing module 214 may be configured to preprocess the at least one text document among the plurality of text documents in the raw dataset. Further, the preprocessing module 214 may be configured to determine the vector based on the at least one preprocessed text document. Furthermore, the preprocessing module 214 may be configured to provide the vector as an input to the unsupervised ML model 104a and the supervised ML model 104b.

In an embodiment, the unsupervised ML model 104a may correspond to a topic model. The topic model provides a natural language processing to discover hidden patterns or themes or topics within the preprocessed at least one text document among the plurality of text documents. The topic model may be configured to group words that frequently co-occur together and represent them as topics, each of which is characterized by a distribution of words in the at least one preprocessed text document. In an example, the plurality of text documents may include the following four documents:

Document 1: "I walk my dog every evening at East Coast Park."

Document 2: "Burke had chicken rice for lunch at Bedok Hawker Center."

Document 3: "The cat symbolizes grace, intelligence, cunning, and independence."

Document 4: "Christina likes to eat almonds, peanuts and walnuts."

In the example, the topic model may be configured to create a vocabulary by collecting unique words from the preprocessed at least one text document. Further, in the example, the topic model may be configured to identify the underlying topics in the at least one preprocessed text document.

The topic model may be configured to consider each of the at least one document in the plurality of text documents, includes a mixture of various topics, and each topic is a distribution of words. The topic model may be configured to determine the optimal distributions that best represent the at least one preprocessed text document. Thus, in the example, the topic model may be configured to obtain four topic distributions. Each topic is represented as a probability distribution over words in the vocabulary. Thus, an output of the topic model may include the probability, i.e., weight compared with an importance score assigned to each word for a given topic generated by the topic model. Further, the topic model may be configured to analyze the distribution of each word in each topic and label the name of at least one cluster or at least one topic. In an example, the topic model may be configured to generate the label for the at least one document among the plurality of text documents, using title-generation techniques by analyzing the distribution of words to generate the label for each of the topics.

For example:

Topic 1: 20% dog, 10% cat, . . . ; wherein the label generated may be "PET".

Topic 2: 30% peanuts, 15% almonds, 10% rice, . . . ; wherein the label generated may be "Food"

Topic 3: Bedok 30%, EastCoast 20%, . . . ; wherein the label generated may be "Location".

Topic 4: Christina, Burke . . . ; wherein the label generated may be "Person".

Thus, the topics obtained by the topic model may provide a high-level understanding of the main themes present in the at least one preprocessed text document among the plurality of text documents.

Furthermore, in an example, the topic model may be configured to utilize both individual words and groups of words using n-grams to perform topic modelling.

In an embodiment, the unsupervised ML model 104a may correspond to a sentiment analysis model. The sentiment analysis model is a natural language processing technique and is configured to determine the sentiment or emotion expressed in the at least one preprocessed text document among the plurality of text documents, such as the movie review or the social media post. In an example, the sentiment analysis model may be configured to classify the text of the at least one preprocessed text document into positive, negative, or neutral sentiments, allowing a user to understand the overall opinion or attitude of the writer associated with the at least one preprocessed text document.

In the example, once the vector is determined by the preprocessing module 214, it is fed into the sentiment analysis model for predicting the sentiment of the movie review. Document 1: "The movie-A was fantastic! The story and performance were engaging, the acting of the actor was superb, and the visuals were stunning. I highly recommend it to everyone."

Thus, the sentiment analysis model may predict a positive sentiment corresponding to Document 1.

The preprocessing module 214, the unsupervised ML model 104a (the topic model), and the supervised ML model 104b (the sentiment analysis model) may be in communication with the determining module 216.

In an embodiment, the determining module 216 may be configured to determine a topic probability score (TPS) corresponding to the at least one preprocessed text document based on the topics obtained by the topic model. In an example, the topic probability score may indicate a probability of each of the at least one preprocessed text document among the plurality of text documents, being associated with the at least one cluster or the at least one topic obtained by the unsupervised ML model 104a. In the example, the topic probability score is the probability of each of the at least one preprocessed text document belonging to the at least one cluster. In the example, Document 1 may have the topic probability score of 0.8 for Topic 1, thus implying that 80% of that document belongs to Topic 1 (cluster). The topic distribution is typically normalized therefore the sum of probability is equal to 1.

In an example, thus, the topic probability score representing the likelihood of each topic within the at least one preprocessed text document is determined. The topic probability score may indicate the contribution of each topic to the overall content of the at least one preprocessed text document. The higher the value in the topic probability score in an array created for the at least one preprocessed text document, the more important or relevant that at least one preprocessed text document is for the corresponding topic.

Document 1: [0.78880892 (Pet), 0.04735383 (Food),
        0.11568199 (Location), 0.04815525 (Person)]; thus,
        document 1 is related 78% to Topic 1.
    Document 2: [0.01349077 (Pet), 0.08379461 (Food),
        0.06341519 (Location), 0.83929943 (Person)]; thus
        document 2 is related 83% to Topic 4.
    Document 3: [0.95929943 (Pet), 0.00349077 (Food),
        0.00379461 (Location), 0.03341519 (Person)]; thus,
        document 3 is related 95% to Topic 1.
    Document 4: [0.04521072 (Pet), 0.72294161 (Food),
        0.04625637 (Location), 0.18559129 (Person)]; thus
        document 4 is related 72% to Topic 2.

In an embodiment, the determining module 216 may be configured to determine a confidence score (CS) corresponding to the at least one preprocessed text document. In an example, the confidence score may indicate a reliability level associated with the classification of each of the at least one preprocessed text document among the plurality of text documents, predicted by the supervised ML model 104b. In the example, the supervised ML model 104b that classifies images as dog or cat may provide an output: Document 1: [0.99 dog, 0.01 cat]; i.e., the determining module 216 may be configured to determine the confidence score corresponding to the at least one preprocessed text document as 99% confident that the image is a dog. Thus, the determining module may determine the confidence score establishing the reliability of the unsupervised ML model's 104b prediction.

In an embodiment, the determining module 216 may be configured to determine a compound distribution score corresponding to each of the at least one preprocessed text document among the plurality of text documents in the raw dataset based on the topic probability score and the confidence score. In an example, the compound distribution score may indicate a weighted average of the topic probability score and the confidence score to generate a comprehensive representation of the output of the unsupervised ML model 104a and the supervised ML model 104b.

In an example, if the raw dataset includes a total of 1600 text documents divided into four topics as obtained from the topic model. In the example, the sentiment analysis model may determine the sentiment of the at least one preprocessed text document and outputs may be confidence scores of positive, negative, and neutral. In the example:
Document 1: Shortage of Inventory.
The sentiment analysis model may provide output as [20% positive, 10% neutral, 70% negative]; thus, the sentiment of Document 1 is negative.
Document 2: Sales Will go Up Next Month.
The sentiment analysis model may provide output as: [80% positive, 10% neutral, 10% negative]; thus the sentiment of Document 2 is positive.
Further, in the example, post obtaining the topics from the topic model, 400 documents may be assigned to each topic based on the topic probability score (TPS) corresponding to each of the at least one preprocessed text document among the plurality of text documents.

Now, in the example, documents 1-399 may be related to Topic 1, and the confidence score of each of the at least one preprocessed text document may be 150 for positive, 100 for negative and 150 for neutral. For the purpose of illustration, the compound distribution score corresponding to only positive and negative sentiments may be calculated.

Thus, the determining module 216 may be configured to determine the compound distribution score as follows:

$$\text{compound distribution score}=(150-100)/400=0.25$$

In an example, the determining module 216 may be configured to determine the compound distribution score for each of the plurality of topics created by the topic model using the:

$$\text{Max(Confidence Score(Pos,Neg,Neu)[document])} \\ *\text{CDS}[0] \qquad\qquad 1$$

Thus, the compound distribution score may correspond to a composite representation, i.e., correlation of the maximum of the topic probability score and the confidence score corresponding to the at least one cluster or the at least one topic obtained from the topic model. Such that the compound distribution score may capture a more comprehensive understanding of the underlying insights of the at least one preprocessed text document among the plurality of text documents. The preprocessing module 214 and the determining module 216 may be in communication with the generating module 218.

In an embodiment, the generating module 218 may be configured to generate the set of textual features corresponding to the at least one preprocessed text document among the plurality of text documents. In an example, the generating module 218 may store a multiclass classification ML model for generating the set of textual features indicating independent variables. Such independent variables may be provided as input to the forecasting ML model 104c for outputting the final forecast.

Figure 4:
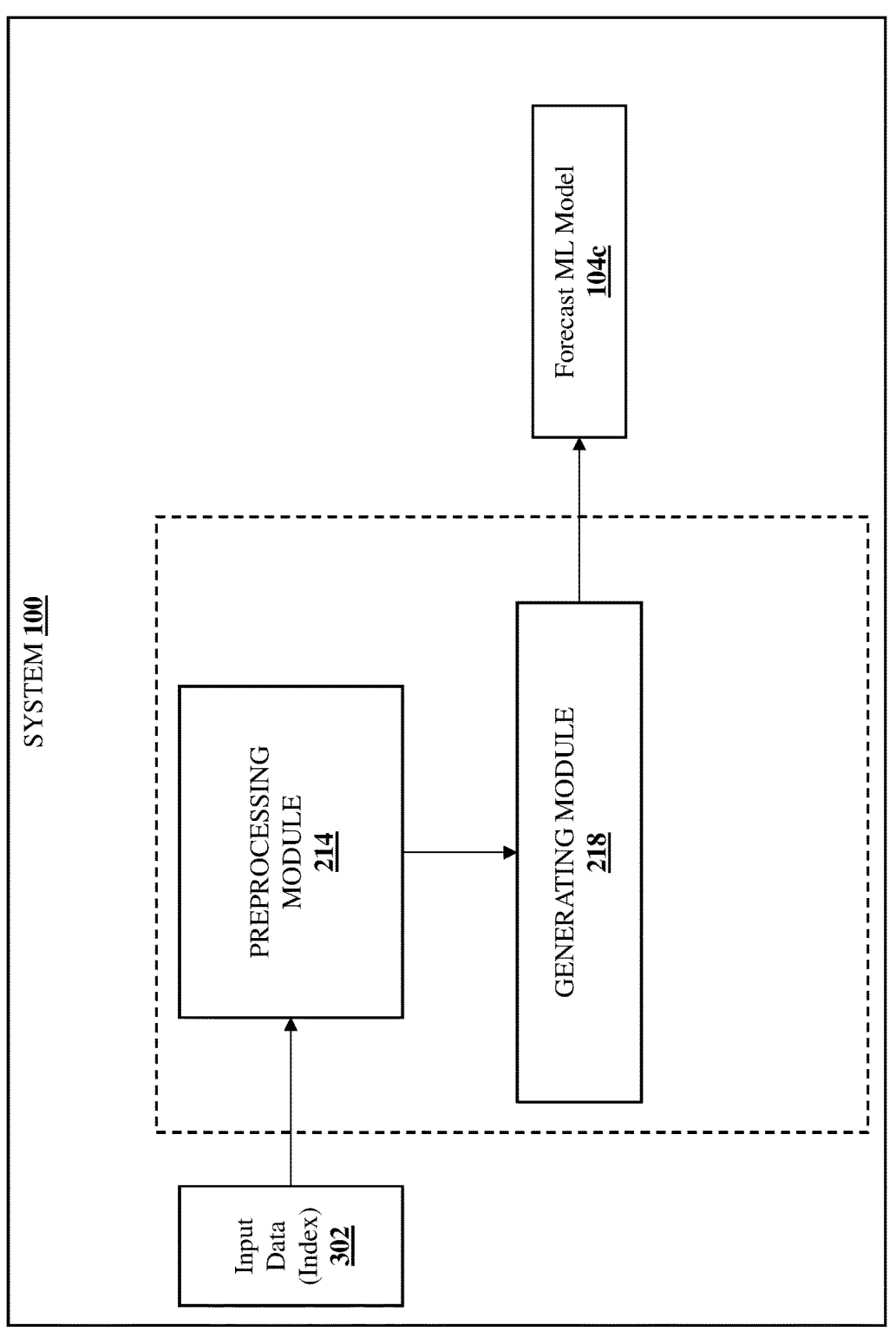
FIG. 4 illustrates an exemplary block diagram of various modules of the system of FIG. 1 for generating a final forecast, according to an embodiment of the present disclosure.

FIG. 4 illustrates an exemplary block diagram of various modules of the system of FIG. 1 for generating a final forecast, according to an embodiment of the present disclosure.

In an embodiment, the generating module 218 may be configured to generate the set of numerical features corresponding to the raw dataset.

In an embodiment, the generating module 218 may be configured to perform a feature importance analysis based on the set of textual features. In an example, the feature importance analysis may indicate assigning a score to the set of textual features, to indicate usefulness for predicting a target variable. In the example, a lasso model may use coefficients corresponding to input features to perform the feature importance analysis. Further, a random forest and/or Extreme Gradient Boosting (XGB) model may utilize a decision tree and an amount of variance reduction to perform the feature importance analysis. The generating module 218 may be in communication with the forecasting ML model 104c.

In an embodiment, the forecasting ML model 104c may be configured to receive the set of textual features and the set of numerical features from the generating module 218 to output the final forecast. In the example, the final forecast may be indicative of predicting the target variable using the forecasting ML model 104c.

In an exemplary embodiment, the forecasting ML model 104c may be configured to generate explainability corresponding to the final forecast. In an example, the forecasting ML model 104c may use model-agnostic methods such as, but not limited to, Local Interpretable Model-agnostic Explanations (LIME) and SHapley Additive exPlanations (SHAP) to generate explainability corresponding to the at least one preprocessed text document based on the correlation of at least one preprocessed text document and the feature importance analysis. In the example, explainability may refers to the ability of the forecasting ML model 104c to provide understandable and interpretable explanations for its decisions or predictions.

Figure 5A:
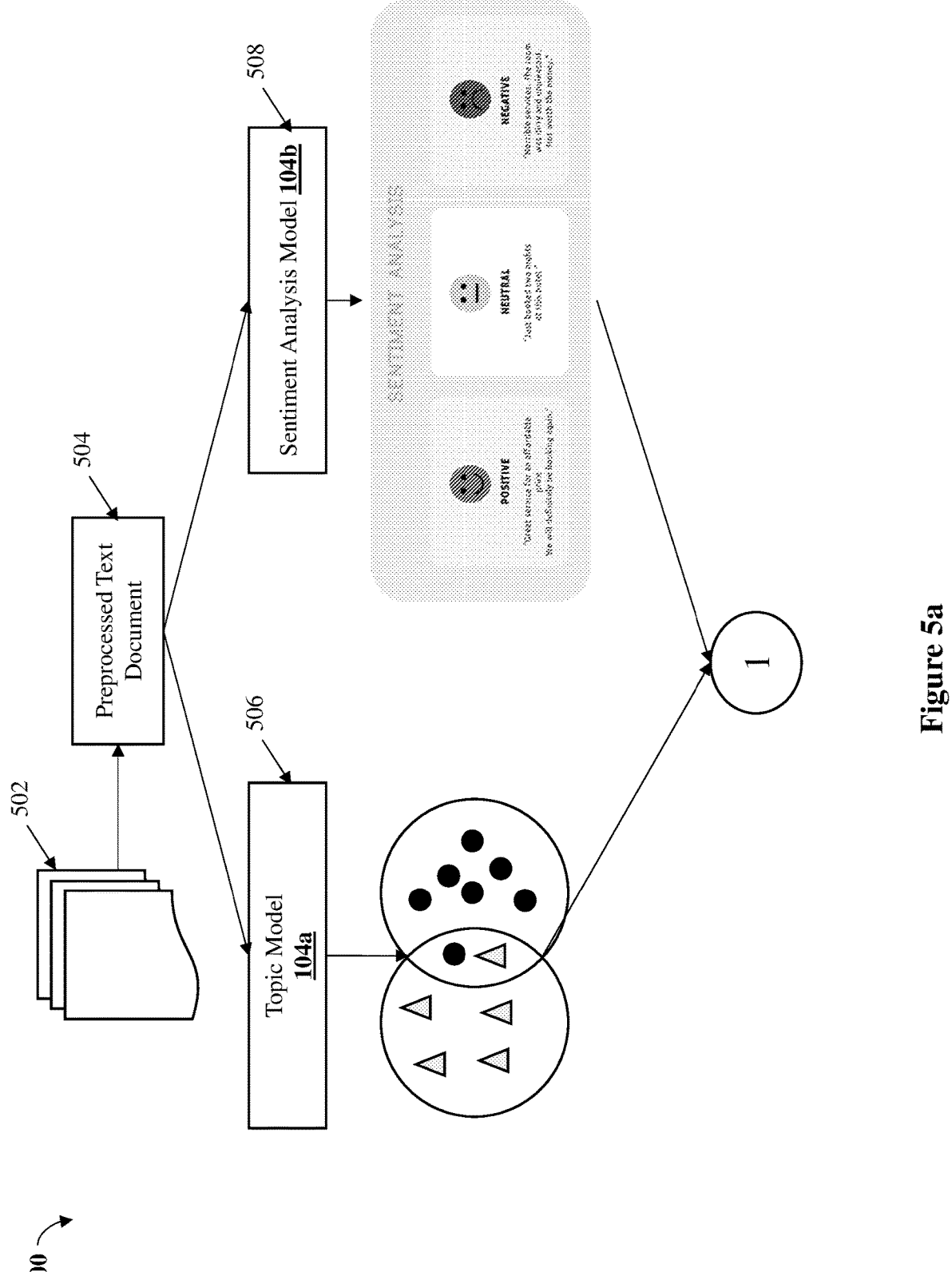
FIG. 5a-5b illustrates an exemplary process flow among one or more blocks of the system of FIG. 1, according to an embodiment of the present disclosure.
Figure 5B:
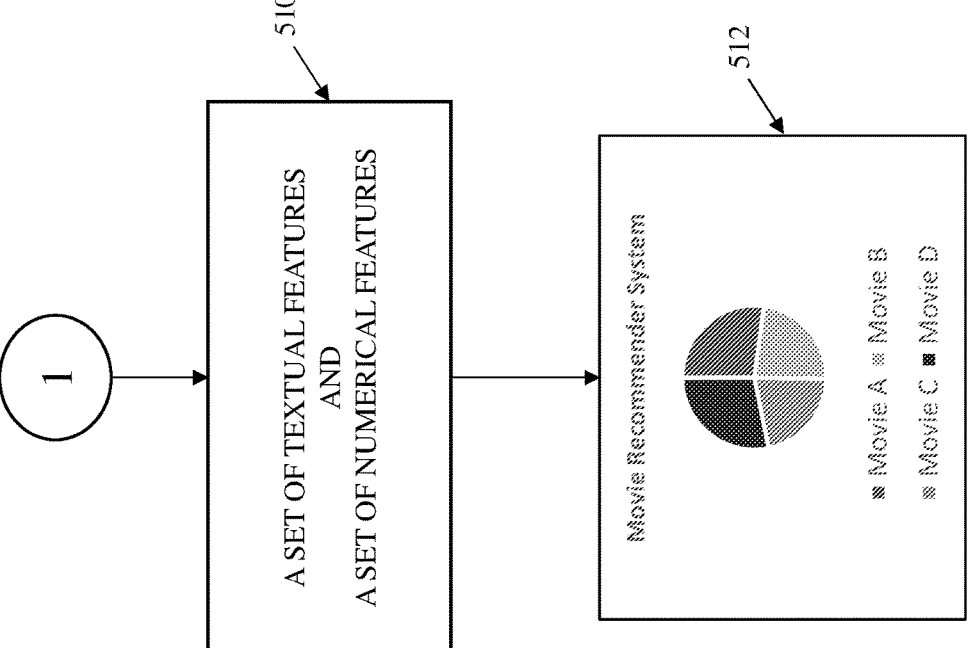
Figure 5B:

FIG. 5a-5b illustrates an exemplary process flow among one or more blocks of the system of FIG. 1, according to an embodiment of the present disclosure. The process flow 500 may be a computer-implemented method executed, for example, by the processor/controller 202 and the one or more modules 206. For the sake of brevity, the constructional and operational features of the system 100 that are already explained in the description of FIG. 1, FIG. 2, FIG. 3, and FIG. 4 are not explained in detail in the description of FIG. 5.

In an embodiment, at block 502, the system 100 may receive the raw dataset including the plurality of text documents.

At block 504, the system 100 may preprocess the plurality of text documents and determine the vector corresponding to each of the at least one preprocessed text document among the plurality of text documents.

At block 506, the system 100 may include providing the vector corresponding to each of the at least one preprocessed text document among the plurality of text documents to the unsupervised ML model 104a (the topic model) for obtaining the topics or the clusters corresponding to the at least one preprocessed text document. Further, the system 100 may include determining the topic probability score associated with the at least one preprocessed text document.

At block 508, the system 100 may include providing the vector corresponding to each of the at least one preprocessed text document among the plurality of text documents to the supervised ML model 104b. In a non-limiting example, the supervised ML model 104b may be one of the sentiment analysis model, a Named Entity Recognition model (NER), and a Part of Speech (POS) model. In the example, while the sentiment analysis model is illustrated as the supervised ML model 104b, it may be apparent that the NER model or the POS model may also be used. Further, in the example, the sentiment analysis model determines the sentiment associated with the at least one preprocessed text document. Further, the system 100 may include determining the confidence score associated with the at least one preprocessed text document.

Furthermore, the system 100 may combine the topic probability score and the confidence score to determine the compound distribution score. Thus, the compound distribution score may correspond to a metric used to measure the sentiment or mood associated with the topics within the plurality of documents.

In an example, in the raw dataset related to movie reviews, the topic model may be used to identify the main topics present in the reviews (at least one preprocessed text document) and then apply the sentiment analysis model to determine the overall sentiment i.e., positive, negative, or neutral (confidence score) of each review.

In the example, determining the compound distribution score may correspond to a "topic mood score" for each of the topics obtained from the topic model by aggregating the confidence scores of the reviews that contain that specific topic. The compound distribution score may be a numerical value that indicates the overall sentiment polarity (positive or negative) of the topic based on the sentiments expressed in the associated reviews.

At block 510, the system 100 may include generating the set of textual features based on the compound distribution score. In an example, the set of numerical features may also be generated based on the at least one preprocessed text document using conventional techniques.

At block 512, the system 100 may include outputting the final forecast based on the set of textual features and the set of numerical features.

In an example, if the topic obtained relates to "acting performance" in movie reviews, the system 100 may calculate the compound distribution score or the topic mood score for this topic by averaging the confidence score of all reviews that mention "acting performance." If the majority of reviews talking about acting performances have positive sentiments, the compound distribution score or the topic mood score for this topic may be relatively high, indicating that audiences generally appreciated the acting in those movies. On the other hand, if the majority of reviews express negative sentiments regarding the acting performance, the compound distribution score or the topic mood score would be low, suggesting that audiences were not satisfied with the acting in those movies.

Thus, the final forecast may be a movie recommender system, outputting a movie recommendation based on the compound distribution score or the topic mood score.

FIG. 6 illustrates a flow chart depicting a method 600 for generating textual features corresponding to at least one text document, according to an embodiment of the present disclosure. The process flow 600 may be a computer-implemented method executed, for example, by the processor/controller 202 and the one or more modules 206. For the sake of brevity, the constructional and operational features of the system 100 that are already explained in the description of FIG. 1, FIG. 2, FIG. 3, FIG. 4, and FIG. 5 are not explained in detail in the description of FIG. 6.

At block 602, the method 600 may include preprocessing the at least one text document among the plurality of text documents in the raw dataset. Further, the method 600 may include determining the vector based on the at least one preprocessed text document. Furthermore, the method 600 may include inputting the vector into the unsupervised ML model 104a and the supervised ML model 104b.

At block 604, the method 600 may include determining the topic probability score (TPS) corresponding to the at least one preprocessed text document, via the unsupervised ML model 104a. In an example, the TPS may indicate a probability of each of the at least one preprocessed text document among the plurality of text documents, being associated with the at least one cluster generated by the unsupervised ML model 104a.

At block 606, the method 600 may include determining the confidence score (CS) corresponding to the at least one preprocessed text document, via the supervised ML model 104*b*. In an example, the CS may indicate a reliability level associated with the classification of each of the at least one preprocessed text document among the plurality of text documents, predicted by the supervised ML model 104*b*.

At block 608, the method 600 may include determining the compound distribution score (CDS) corresponding to each of the at least one preprocessed text document among the plurality of text documents in the raw dataset based on the determined TPS and the determined CS. In an example, the CDS may indicate a weighted average of the TPS and the CS to generate the comprehensive representation of the output of the unsupervised ML model 104*a* and the supervised ML model 104*b* respectively.

At block 610, the method 600 may include generating the set of textual features corresponding to the at least one preprocessed text document among the plurality of text documents based on inputting the determined TPS, the CS, and the CDS into the multiclass classification machine learning model. In an example, the set of textual features indicates independent variables for the forecasting model 104*c*.

In an example, the method 600 may include the forecasting model 104*c* receiving the set of numerical features corresponding to the raw dataset. Further, the method 600 may include the forecasting model 104*c* outputting the final forecast based on the set of textual features and the set of numerical features. In the example, the final forecast may indicate prediction of the target variable using the forecasting model 104*c*.

In an example, the method 600 may include the forecasting model 104*c* receiving the feature importance analysis based on the set of textual features. In the example, the feature importance analysis may indicate assigning the score to the set of textual features, to indicate usefulness for predicting the target variable. Thus, in the example, the forecasting model 104*c* may generate the explainability corresponding to the at least one preprocessed text document based on the feature importance analysis.

While the above steps shown in FIG. 6 are described in a particular sequence, the steps may occur in variations to the sequence in accordance with various embodiments of the present disclosure.

To summarize, the present disclosure provides methods and system for generating textual features for the trained machine learning model 104 with high accuracy and reliability.

The present invention has following advantages:

a) The present invention provides an enhanced feature set comprising of textual features.

b) The present invention provides improves the textual features which thus improves output of ML Models, particularly the forecasting ML model.

c) The present invention provides textual-explainability with the generated textual features.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method for generating textual features corresponding to at least one text document, the method being performed by at least one processor communicably coupled to a memory and comprising:

preprocessing the at least one text document among a plurality of text documents in a raw dataset;

determining a topic probability score (TPS) corresponding to the at least one preprocessed text document, via an unsupervised machine learning (ML) model, wherein the TPS indicates a probability of each of the at least one preprocessed text document among the plurality of text documents, being associated with at least one cluster generated by the unsupervised ML model;

determining a confidence score (CS) corresponding to the at least one preprocessed text document, via a supervised ML model, wherein the CS indicates a reliability level associated with a classification of each of the at least one preprocessed text document among the plurality of text documents, predicted by the supervised ML model;

determining a compound distribution score (CDS) corresponding to each of the at least one preprocessed text document among the plurality of text documents in the raw dataset based on the TPS and the CS, wherein the CDS indicates a weighted average of the TPS and the CS to generate a comprehensive representation for output of the unsupervised ML model and the supervised ML model respectively;

generating a set of textual features corresponding to the at least one preprocessed text document among the plurality of text documents based on inputting the determined TPS, the CS, and the CDS respectively, into a multiclass classification machine learning model, wherein the set of textual features indicates independent variables for a forecasting model, and comprises time series data;

receiving a set of numerical features corresponding to the raw dataset;

inputting the set of textual features and the set of numerical features into the forecasting model; and outputting, to a display and via the forecasting model, a final forecast based on the set of textual features and the set of numerical features, wherein the final forecast indicates predicting a target variable using the forecasting model.

2. The method as claimed in claim 1, wherein prior to determining the TPS and the CS, the method comprises:

determining at least one vector based on the at least one preprocessed text document;

inputting the at least one vector into the unsupervised ML model and the supervised ML model; and determining the TPS and the CS via the unsupervised ML model and the supervised ML model respectively, based on the at least one vector.

3. The method as claimed in claim 2, wherein the at least one vector is determined using one of a counter vectorization technique, a term Frequency-Inverse Document Frequency (TF-IDF) technique, a word2vec technique, and a GloVe technique.

4. The method as claimed in claim 1, further comprising:

performing a feature importance analysis based on the set of textual features, wherein the feature importance analysis indicates assigning a score to the set of textual features, to indicate usefulness for predicting the target variable;

correlating the at least one preprocessed text document and the feature importance analysis; and generating explainability corresponding to the at least one preprocessed text document based on the correlation.

5. The method as claimed in claim 1, wherein determining the CDS comprises:

determining a maximum value of the confidence score;

correlating the maximum value of the confidence score and the TPS corresponding to the at least one cluster associated with the at least one preprocessed text document; and determining the CDS for the at least one document based on the correlation.

6. The method as claimed in claim 1, wherein the unsupervised machine learning model is a topic model for determining at least one topic present in the at least one preprocessed document, and wherein the unsupervised machine learning model includes one of a Bidirectional Encoder Representations from Transformers (BERT) topic model, a Correlation Explanation (CorEx) model, a Latent Dirichlet Allocation (LDA) model, a Non-Negative Matrix Factorization (NMF) model, a guided LDA model, and a Gensim mode with natural language processing to understand a context and label the at least one document among the plurality of text documents.

7. The method as claimed in claim 1, wherein the supervised machine learning model is one of a sentiment analysis model, a Named Entity Recognition model, an N-Gram model, and a Part-of-speech (POS) labelling Model.

8. The method as claimed in claim 1, wherein the at least one text document is preprocessed using one of a stemming and a lemmatization with natural language processing.

9. A system for generating textual features corresponding to at least one text document, the system comprising:

a memory;

a display; and at least one processor communicably coupled to the memory, the at least one processor is configured to:

preprocess the at least one text document among a plurality of text documents in a raw dataset;

determine a topic probability score (TPS) corresponding to the at least one preprocessed text document, via an unsupervised machine learning (ML) model, wherein the TPS indicates probability of each of the at least one preprocessed text document among the plurality of text documents, being associated with at least one cluster generated by the unsupervised ML model;

determine a confidence score (CS) corresponding to the at least one preprocessed text document, via a supervised ML model, wherein the CS indicates a reliability level associated with classification of each of the at least one preprocessed text document among the plurality of text documents, predicted by the supervised ML model;

determine a compound distribution score (CDS) corresponding to each of the at least one preprocessed text document among the plurality of text documents in the dataset based on the determined TPS and the determined CS, wherein the CDS indicates a weighted average of the TPS and the CS to generate a comprehensive representation for output of the unsupervised ML model and the supervised ML model respectively;

generate a set of textual features corresponding to the at least one preprocessed text document among the plurality of text documents based on inputting the determined TPS, the CS, and the CDS into a multiclass classification machine learning model, wherein the set of textual features indicates independent variables for a forecasting model, and comprises time series data;

receive a set of numerical features corresponding to the raw dataset;

input the set of textual features and the set of numerical features into the forecasting model; and output, to the display and via the forecasting model, a final forecast based on the set of textual features and the set of numerical features, wherein the final forecast indicates predicting a target variable using the forecasting model.

10. The system as claimed in claim 9, wherein prior to determining the TPS and the CS, the at least one processor is configured to:

determine at least one vector based on the at least one preprocessed text document;

input the at least one vector into the unsupervised ML model and the supervised ML model; and determine the TPS and the CS via the unsupervised ML model and the supervised ML model respectively, based on the at least one vector.

11. The system as claimed in claim 9, wherein the at least one processor is further configured to:

perform a feature importance analysis based on the set of textual features, wherein the feature importance analysis indicates assigning a score to set of textual features, to indicate usefulness for predicting the target variable;

correlate the at least one preprocessed text document and the feature importance analysis; and generate explainability corresponding to the at least one preprocessed text document based on the correlation.

12. The system as claimed in claim 9, wherein to determine the CDS the at least one processor is configured to:

determine a maximum value of the confidence score;

correlate the maximum value of the confidence score and the TPS corresponding to the at least one cluster associated with the at least one preprocessed text document; and determine the CDS for the at least one document based on the correlation.

13. The system as claimed in claim 9, wherein the unsupervised machine learning model is a topic model for determining at least one topic present in the at least one preprocessed document, and wherein the unsupervised machine learning model includes one of a Bidirectional Encoder Representations from Transformers (BERT) topic model, a Correlation Explanation (CorEx) model, a Latent Dirichlet Allocation (LDA) model, a Non-Negative Matrix Factorization (NMF) model, a guided LDA model, and a Gensim mode with natural language processing to understand a context and label the at least one document among the plurality of text documents.

14. The system as claimed in claim 9, wherein the supervised machine learning model is one of a sentiment analysis model, a Named Entity Recognition model, an N-Gram model, and a Part-of-speech (POS) labelling Model.

15. The system as claimed in claim 9, wherein the at least one text document is preprocessed using one of a stemming and a lemmatization with natural language processing.

16. The system as claimed in claim 9, wherein the at least one vector is determined using one of a counter vectorization technique and a term Frequency-Inverse Document Frequency (TF-IDF) technique.

* * * * *